(12) United States Patent
Bernhardt et al.

(10) Patent No.: US 6,578,641 B2
(45) Date of Patent: Jun. 17, 2003

(54) HITCH SYSTEM WITH SYNCHRONIZED CYLINDERS

(75) Inventors: Gerd Bernhardt, Hanichen (DE); Sergiy Fedotov, Dresden (DE); Ruslan Rudik, Dresden (DE); Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/102,409

(22) Filed: Mar. 20, 2002

(65) Prior Publication Data

US 2002/0135154 A1 Sep. 26, 2002

(30) Foreign Application Priority Data

Mar. 22, 2001 (DE) .......................... 101 14 092

(51) Int. Cl.⁷ .......................... A01B 63/10; F15B 13/02
(52) U.S. Cl. .................. 172/439; 172/7; 280/446.1; 91/515
(58) Field of Search ................ 172/2, 3, 4, 4.5, 172/7, 8, 439, 440, 441, 442, 445; 280/446.1, 449, 477, 478.1, 479.1; 414/636; 187/274, 275; 91/515; 60/419

(56) References Cited

U.S. PATENT DOCUMENTS

| | | | |
|---|---|---|---|
| 4,335,894 A | | 6/1982 | Swanson ............... 280/43.23 |
| 4,510,849 A | * | 4/1985 | Khramtsov et al. ........ 91/515 |
| 5,454,432 A | * | 10/1995 | Le Clezio .................. 172/7 |
| 6,230,817 B1 | * | 5/2001 | Haugen ..................... 172/7 |
| 6,253,859 B1 | | 7/2001 | Coenen ................... 172/448 |
| 6,321,851 B1 | * | 11/2001 | Weiss et al. ............. 172/444 |
| 6,349,543 B1 | * | 2/2002 | Lisniansky ................ 60/419 |
| 6,378,301 B2 | * | 4/2002 | Endo et al. ............... 60/419 |
| 6,505,711 B1 | * | 1/2003 | Zurcher et al. ........... 187/285 |

* cited by examiner

Primary Examiner—Robert E. Pezzuto
Assistant Examiner—Nathan Mammer

(57) ABSTRACT

An implement/vehicle hitch system for coupling implements to a utility vehicle includes two hydraulic cylinders for adjusting the position of the implement. The hydraulic cylinders are connected to a pair of motor/pump units which cause the hydraulic cylinders to operate in a synchronous manner.

10 Claims, 4 Drawing Sheets

HITCH SYSTEM WITH SYNCHRONIZED CYLINDERS

FIELD OF THE INVENTION

The invention relates to a hitch for movably coupling an implement to a utility vehicle, and in particular, to a hitch having a pair of hydraulic cylinders for controlling the position of the implement with respect to the utility vehicle.

BACKGROUND OF THE INVENTION

Implement hitches are known for coupling implements to agricultural and industrial vehicles. For example, a three point hitch may be attached to the rear of an agricultural tractor. Such a hitch normally includes two lower arms and an upper arm whose free ends are equipped with catch hooks or other fastening means for fastening attached implements. Usually each of the lower arms is connected through lift struts with a common lift shaft, that can be rotated hydraulically. This results in a rigid mechanical connection between the two lower arms and an enforced synchronization of the lower arms.

U.S. Pat. No. 6,253,859 shows a hitch, in which each lower draft link can be raised and lowered individually by a separate lift cylinder, instead of a lift strut and a lift shaft. In such a hitch, which is often used with front power lifts, the synchronization of the two lower arms must be guaranteed by an active control of the hydraulic cylinders. This requires additional power consumption and a corresponding control system.

SUMMARY OF THE INVENTION

An object of the present invention is to provide a hitch with separate lift cylinders which are synchronously operated without the application of additional energy sources and without additional control systems.

This and other objects are achieved by the present invention wherein an implement attachment interface or hitch couples an implement to a utility vehicle. The hitch includes a pair of hydraulic cylinders which operate to control the position of the implement. The hydraulic cylinders are communicated with a gear-type flow divider or motor/pump unit which synchronizes the operation of the cylinders without requiring an additional power source.

The motor/pump unit synchronizes the cylinders even during floating operation, such as when the hydraulic cylinders are unpressurized. Floating operation can be used during ground breaking or during plowing with a plow. Alternatively, the lift cylinders can be connected with a conventional depth control system to control implement depth.

The invention assures the synchronous operation of the hydraulic cylinders in the floating position without mechanical connections. No common lift shaft or other mechanical connecting means between the coupling elements is required. An additional hydraulic pump is not required during floating operation to maintain a constant side-to-side orientation of the implement. Defects that could occur from an active control of the lift cylinders, can be avoided.

It is possible to connect only the piston end chambers or only the rod end chambers of the two hydraulic cylinders with the motor/pump unit. However, preferably, the hydraulic cylinders are double acting hydraulic cylinders and the two piston end chambers and the rod end chambers are connected to the rotors of the motor/pump unit.

Preferably, the motor/pump unit includes at least two rotors arranged on a common shaft. The rotors are pairs of gears that are configured as pump/motor units. Each rotor is connected on the one hand with the piston end chamber of one of the two hydraulic cylinders and on the other hand with a reservoir, such as the fluid reservoir for the operating hydraulic fluid of the utility vehicle.

Preferably, the motor/pump unit includes at least two rotors arranged on a common shaft, each of which is connected on the one hand with the rod end chamber of one of the two hydraulic cylinders and on the other hand with a reservoir.

Alternatively, the motor/pump unit includes four rotors arranged on a common shaft. Two of these rotors have a larger intake capacity and are connected with the piston end chamber of one of the two hydraulic cylinders. Two of the rotors have a smaller intake capacity and are connected with the rod end chamber of one of the two hydraulic cylinders. All rotors are connected on the other hand with a reservoir.

In a further preferred embodiment, the motor/pump unit includes at least two rotors arranged on a common shaft of which a first rotor is connected with the piston end chamber of a first hydraulic cylinder and a second rotor is connected with the rod end chamber of a second hydraulic cylinder and both rotors, on the other hand, are connected with a reservoir.

Two motor/pump units may be provided where a first motor/pump unit includes two rotors arranged on a common first shaft, of which a first rotor is connected with the piston end chamber of a first hydraulic cylinder and a second rotor is connected with the rod end chamber of a second hydraulic cylinder. A second motor/pump unit also includes two rotors arranged on a second common shaft of which a first rotor is connected with the rod end chamber of the first hydraulic cylinder and a second rotor is connected with the piston end chamber of the second hydraulic cylinder. All rotors are connected, on the other hand, with a reservoir.

Preferably, the intake capacity of the rotors conforms with each of the associated hydraulic cylinder chambers. If, for example, the two piston chambers of a double acting hydraulic cylinder are connected with a rotor of a motor/pump unit that include two rotors, then the synchronous operation of the hydraulic cylinders is guaranteed when the intake capacity of the first rotor is proportional to the effective piston surface of the associated first cylinder volume, and simultaneously the intake capacity of the second rotor is proportional to the effective piston surface of the associated second cylinder chamber.

Since it may be difficult to make the volumes comply precisely to each other, during floating operation negative pressures may occur in the system. These may have a negative effect on the efficiency and the properties of the hydraulic fluid and lead to cavitation in the system. Therefore, it is advantageous for a reliable operation to provide check valves that permit a flow of fluid from the reservoir to the hydraulic cylinders, as long as the pressure in a hydraulic cylinder chamber drops below a predetermined pressure.

The hitch is preferably a three-point implement hitch in which the lower arms are not connected over lift struts to a lift shaft, but are connected through a hydraulic cylinder each configured as a lift cylinder in order to raise and lower them. During floating operation the hydraulic cylinders are separated from the pressure supply, that is used for the raising and lowering of the hydraulic cylinders, and connected with flow dividers which synchronize the cylinders.

This hitch or implement interface can be attached to the rear of a tractor, or it can also be used as a front power lift, and is preferable to previous arrangements in which the lower arms of the front power lift are rigidly connected to each other in order to attain synchronization. In this case, however, an inclined position in which the two transverse elements occupy different positions in height, was not possible.

In one embodiment, the hitch includes hydraulic cylinders arranged in the form of a hexapod, such as described in German patent application DE 199 51 840.8, which is incorporated by reference herein. In this case, at least two of the six hydraulic cylinders of the hexapod are connected as described above with a motor/pump unit. Preferably, the two hydraulic cylinders of the hexapod which extend generally in the vertical direction and therefore absorb vertical forces, are connected to one or two motor/pump units.

In order to move the implement to a desired position, the piston end chambers and/or rod end chambers of the hydraulic cylinders are connected via a control valve with a pressure source. The control valve permits a switch between a floating operational mode, in which the motor/pump units are effective, and an operating position in which the hydraulic cylinders can be connected to a hydraulic pressure source. The valve arrangement may be used to control and flow of hydraulic fluid to and from the hydraulic cylinders.

DESCRIPTION OF THE PREFERRED EMBODIMENT

Figure 1:
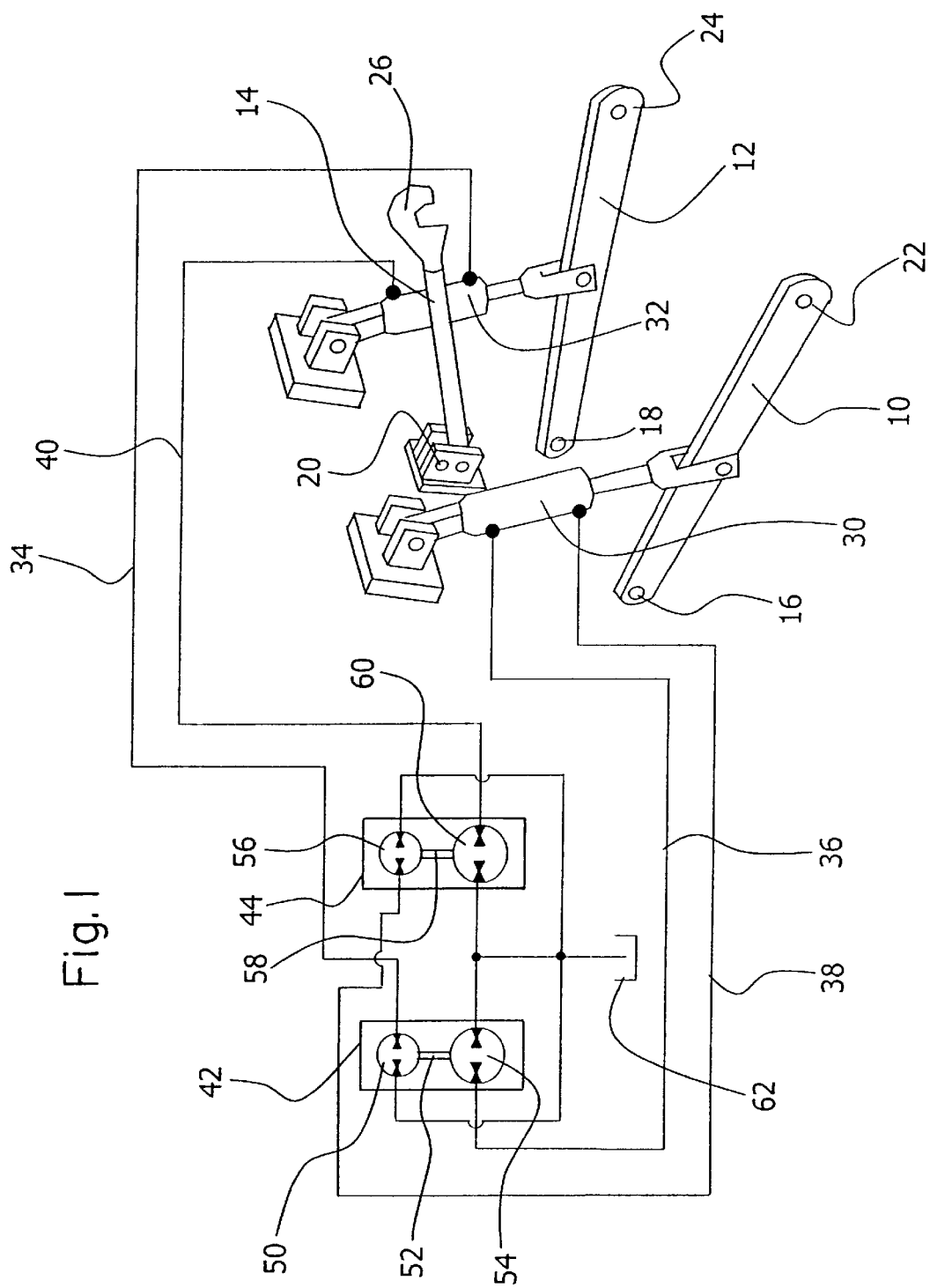
FIG. 1 is a schematic view of an implement attachment interface or hitch according to the present invention, with two lower draft links and an upper link or arm.

As seen in FIG. 1, a hitch includes two lower arms or draft links 10, 12 and an upper arm or link 14 with ends 16, 18, 20 for pivotally coupling to an agricultural tractor (not shown), and with free ends having conventional couplers 22, 24 or a catch hook 26 for engaging an implement (not shown). Preferably, the upper arm 14 includes and integral hydraulically operated upper arm cylinder (not shown) for varying the length of the upper arm 14, so that an implement can be pivoted about a generally horizontal axis which is transverse to the fore and aft axis of the vehicle. Hydraulic cylinder 30, 32 each are coupled between a corresponding one of the draft links 10, 12 and fixed pivot supports 25 and 27.

The cylinders 30, 32 are double acting cylinders, each having a piston end chamber and a rod end chamber. The piston end chamber and a rod end chamber are connected via hydraulic hoses 34, 36, 38, 40 with a first and a second motor/pump unit 42, 44. The first motor/pump unit 42 includes a first gear-type rotor 50 which is connected by a first shaft 52 for rotation with a second gear-type rotor 54. Similarly, the second motor/pump unit 44 includes a third gear-type rotor 56 which is connected by a second shaft 58 for rotation with a fourth gear-type rotor 60. The rotors 50, 54, 56, 60 operate as both hydraulic pumps and motors. If one of the two rotors of a motor/pump unit is driven by fluid pressure then that rotor acts as a motor and drives, via the corresponding shaft, the other rotor, which acts as a pump. If the pressure relationships in the hydraulic circuits are reversed, then the two rotors operate in the opposite way.

The rod end chamber of a second hydraulic cylinder 32 is connected by a first hydraulic hose 34 to the first rotor 50 of the first motor/pump unit 42. The piston end chamber of a first hydraulic cylinder 30 is connected by a second hydraulic hose 36 to the second rotor 54 of the first motor/pump unit 42. The rod end chamber of the first hydraulic cylinder 30 is connected by a third hydraulic hose 38 to the third rotor 56 of the second motor/pump unit 44. The piston end chamber of the second hydraulic cylinder 32 is connected by a fourth hydraulic hose 40 to the fourth rotor 60 of the second motor/pump unit 44. Each of the rotors 50, 54, 56, 60 is also connected with a reservoir 62.

The capacities of the rotors 50, 54, 56, 60 conform to the volumes of associated piston end chambers or rod end chambers of the cylinders 30, 32. The rotors 50, 56 associated with the two rod end chambers have a smaller volume capacity than the rotors 54, 60 associated with the piston end chambers, since the piston end chambers have a larger cross section than the rod end chambers.

The system shown in FIG. 1 operates as follows. If lower arm 10 is raised by cylinder 30, then its piston end chamber forces hydraulic fluid into the second rotor 54 of the first motor/pump unit 42. The second rotor 54 drives the first rotor 50 which forces hydraulic fluid into the rod end chamber of the second hydraulic cylinder 32 which retracts and raises the other lower arm 12. This assures that both lower arms 10, 12 move together. Both motor/pump units 42, 44 control the flow into the hydraulic cylinders 30, 32 as well as the flow out of the hydraulic cylinders 30, 32.

Figure 2:
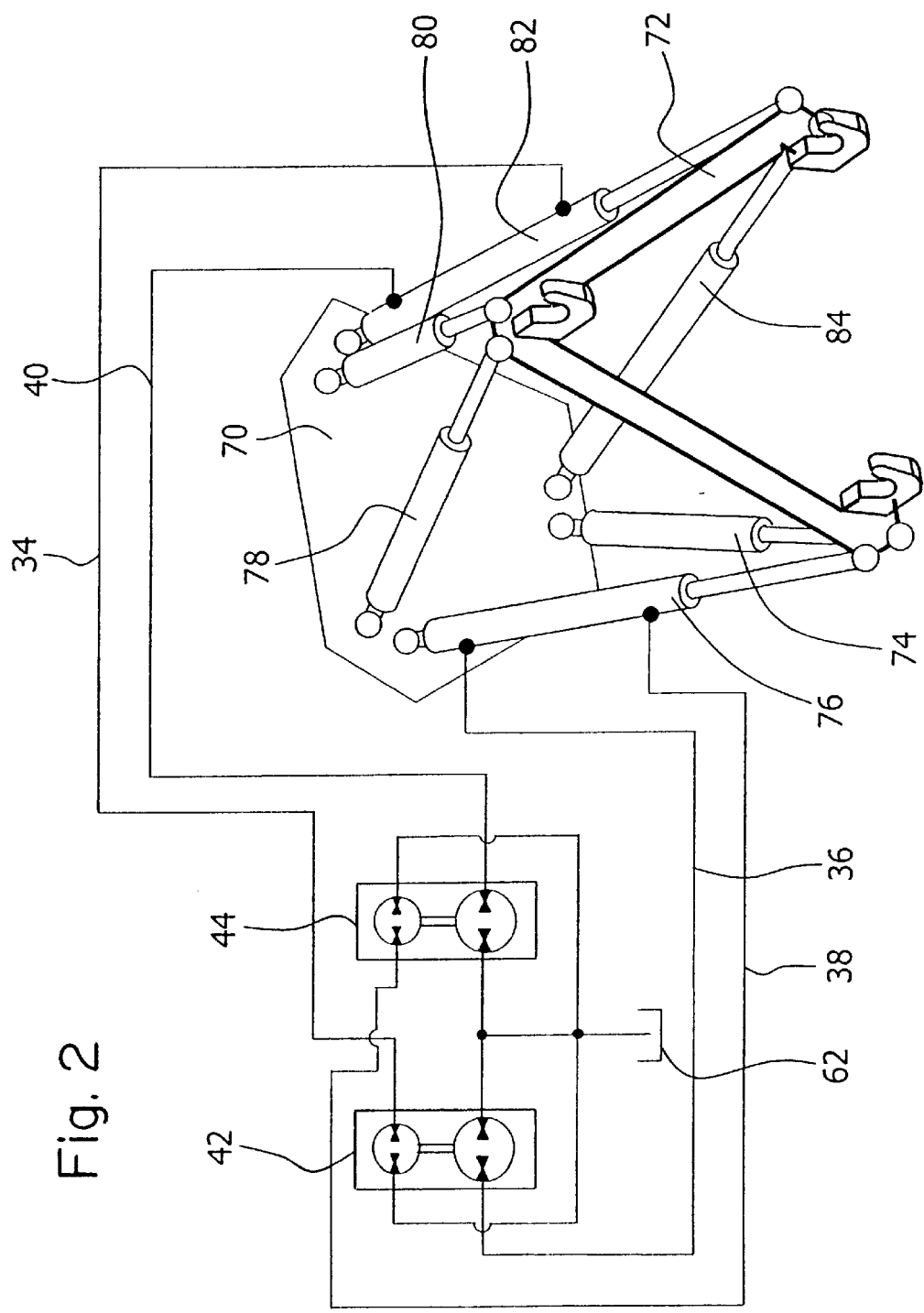
FIG. 2 is a schematic view of an alternative hitch assembly with hydraulic cylinders in a hexapod arrangement.

Referring now to FIG. 2, an alternate embodiment of the hitch system includes six hydraulic cylinders 74, 76, 78, 80, 82, 84 in a hexapod arrangement between the vehicle body 70 and a generally V-shaped coupling frame 72. Such hexapod hitch arrangements are known from German patent application DE 199 51 840.8, which is incorporated herein by reference.

The hydraulic cylinders 76 and 82 project rearwardly and downwardly from the vehicle body 70, and normally absorb vertical forces applied to the coupling frame 72. Cylinders 76 and 82 are double acting hydraulic cylinders and are connected with two motor/pump units 42, 44 similar to the connection shown in FIG. 1, so that the system of FIG. 2 operates similar to the system of FIG. 1.

Figure 3:
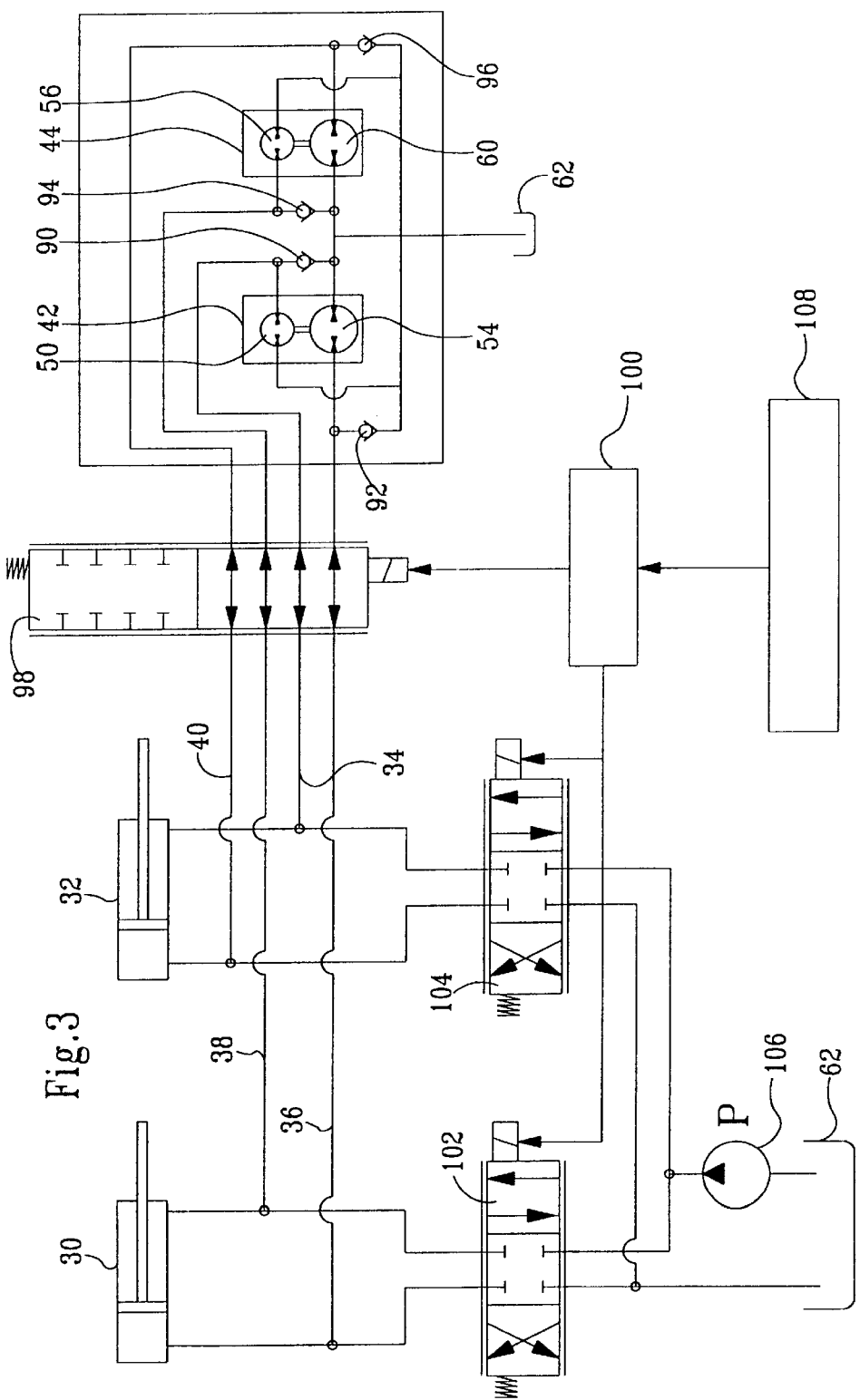
FIG. 3 is a schematic diagram of a hydraulic control circuit for the implement attachment interface of FIGS. 1 and 2.

Referring now to FIG. 3, the same reference numbers are used for similar parts as in FIG. 1. The motor/pump units 42, 44 are connected to check valves 90, 92, 94, 96 which are located between reservoir 62 and a corresponding one of hoses 34, 36, 38, 40. The check valves 90, 92, 94, 96 open upon a predetermined pressure difference between the hydraulic lines 34, 36, 38, 40 and the reservoir 62 and permit a flow of hydraulic fluid from the reservoir 62 into the particular hydraulic line 34, 36, 38, 40 under a negative pressure condition. In this way negative pressures in the cylinders 30, 32 and the motor/pump units 42, 44 are avoided.

A valve 98 is located between the cylinders 30, 32 and the motor/pump units 42, 44. Valve 98 is urged by a spring to a closed position wherein it closes communication through all four hydraulic lines 34, 36, 38, 40. The valve 98 can be opened by a solenoid under the control of a control unit 100.

Selector valves 102, 104 control communication between the piston and rod end chambers of cylinders 30, 32 and a hydraulic pump 106 and a reservoir 62. The two selector valves 102, 104 are preferably four-way, three-position valves which can be controlled electrically by the control unit 100. Valves 102, 104 are movable from the closed position shown, to a first deflected position wherein the piston end chamber of the corresponding cylinder 30, 32 is pressurized and the rod end chamber is unpressurized, so that the associated cylinder 30, 32 extends. Valves 102, 104 are also movable to a second position wherein pressure is applied to the rod end chamber of the corresponding cylinder and the piston end chamber is unpressurized, so that cylinders 30, 32 retract.

Operator commands are communicated by a manually operated input unit 108 to the control unit 100, so that the cylinders 30, 32 can be controlled by the selector valves 102, 104 or a floating operation can be enabled by closing selector valves 102, 104 and opening valve 98 as shown in FIG. 3, to synchronize operation of cylinders 30, 32.

Figure 4:
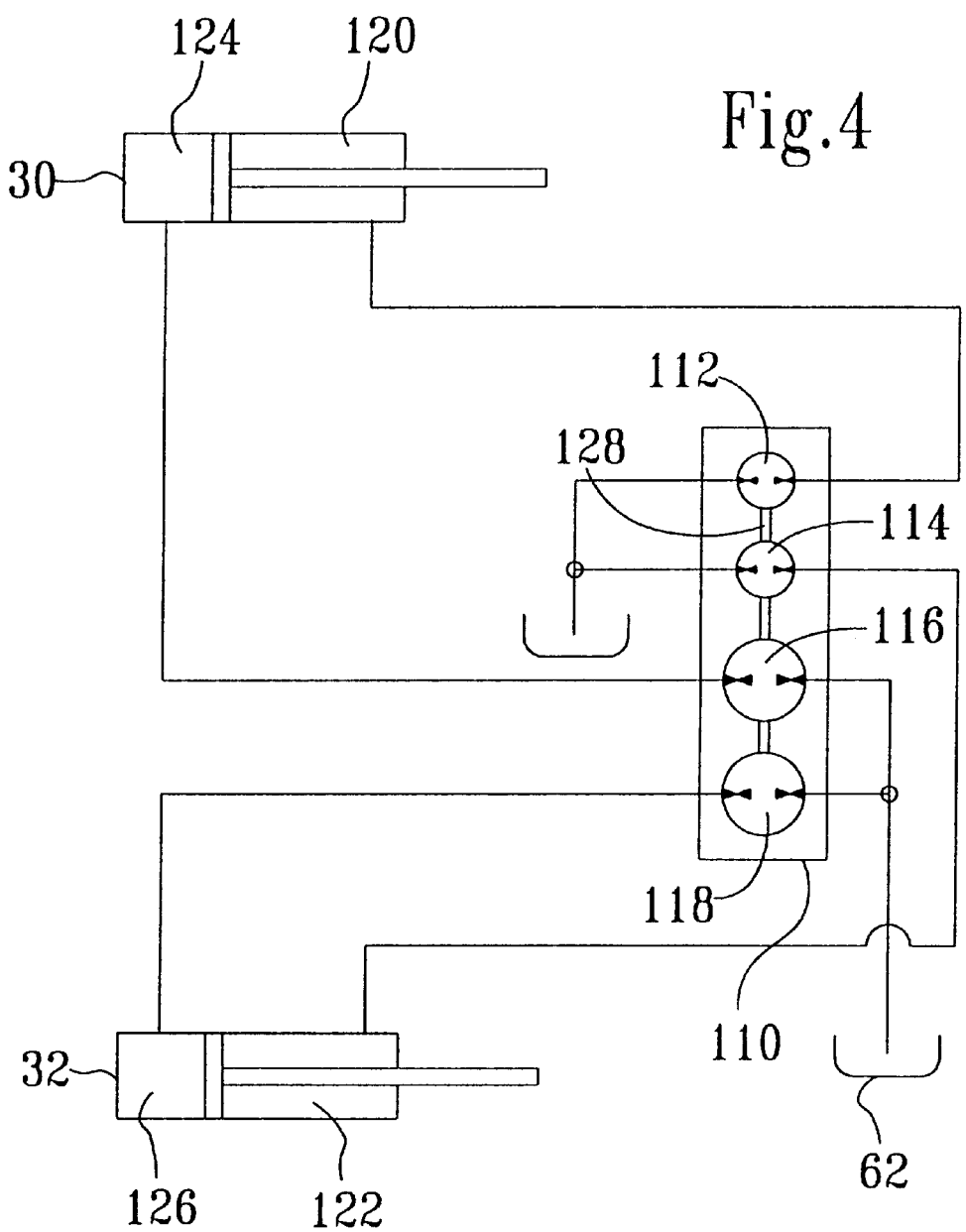
FIG. 4 is a schematic diagram of an alternative hydraulic control circuit.

Referring now to FIG. 4, an alternative motor/pump unit 110 includes four rotors 112, 114, 116, 118 rigidly interconnected by shaft 128. The two smaller rotors 112, 114 are connected with the rod end chambers 120, 122 of cylinders 30, 32, and the larger rotors 116, 118 are connected with the piston end chambers 124, 126 of cylinders 30, 32. If cylinder 30 is retracted, then fluid flows out of piston end chamber 124 and into rod end chamber 120. This fluid flow drives rotors 116 and 112 in the same direction. Rotors 116, 112 act as motors which drive rotors 114 and 118 which pump fluid out of chamber 126 and into chamber 122 of cylinder 32 so that cylinder 32 moves in synchrony with cylinder 30.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. An implement/vehicle hitch system comprising:
    a hitch mounted on the vehicle and having left and right coupling members;
    first and second hydraulic cylinders, each coupled to a corresponding one of the coupling members for adjusting a position thereof, each cylinder having a rod end chamber and a piston end chamber;
    a pressure source;
    a first valve assembly for controlling communication between the pressure source and the cylinders;
    first and second gear-type motor/pump units, each motor/pump unit having first and second rotors coupled together by a shaft; and
    a second valve assembly for controlling communication between the cylinders and the motor/pump units, the second valve assembly having an open position wherein the first rotor of the first unit is communicated with a rod end chamber of the first cylinder, the second rotor of the first unit is communicated with a piston end chamber of the second cylinder, the first rotor of the second unit is communicated with a rod end chamber of the second cylinder, the second rotor of the second unit is communicated with a piston end chamber of the first cylinder, the motor/pump units causing the cylinders to operate synchronously when the second valve assembly is open and the first valve assembly closes communication between the pressure source and the cylinders.

2. The hitch system of claim 1, wherein:
   the cylinders are double acting hydraulic cylinders.

3. The hitch system of claim 1, wherein:
    a rotor which is communicated to the piston end chamber is also communicated with a reservoir.

4. The hitch system of claim 1, wherein:
    a rotor which is communicated to the rod end chamber is also communicated with a reservoir.

5. The hitch system of claim 1, wherein:
    the four rotors are coupled together by a common shaft, a first pair of said rotors having a greater intake capacity and being communicated with the piston end chambers of the cylinders, and a second pair of the rotors having a smaller intake capacity and being communicated with the rod end chambers of the cylinders, and all of the rotors being communicated with a reservoir.

6. The hitch system of claim 1, wherein:
    the rotors are communicated with a reservoir.

7. The hitch system of claim 1, wherein:
    the capacities of the rotors is related to capacities of corresponding chambers of the cylinders.

8. The hitch system of claim 1, further comprising:
   check valves which prevent fluid flow directly from the cylinders to a reservoir and which permits fluid flow from the reservoir to the cylinders.

9. The hitch system of claim 1, wherein:
    the coupling members comprise draft links of a three-point implement hitch.

10. The hitch system of claim 1, wherein:
    the first and second hydraulic cylinders comprise part of six hydraulic cylinder are arranged in a hexapod.

* * * * *